(12) United States Patent
Hetherton

(10) Patent No.: US 9,650,194 B2
(45) Date of Patent: May 16, 2017

(54) RESEALABLE LABEL FLAP WITH TAMPER EVIDENT STRUCTURE

(71) Applicant: HFM Packaging, Ltd., Pewaukee, WI (US)

(72) Inventor: Scott Hetherton, Oconomowoc, WI (US)

(73) Assignee: HFM Packaging, LTD., Pewaukee, WI (US)

( * ) Notice: Subject to any disclaimer, the term of this patent is extended or adjusted under 35 U.S.C. 154(b) by 161 days.

(21) Appl. No.: 14/557,548

(22) Filed: Dec. 2, 2014

(65) Prior Publication Data

US 2016/0152393 A1     Jun. 2, 2016

(51) Int. Cl.
    *B65D 75/58*         (2006.01)
    *B65D 65/14*         (2006.01)
                    (Continued)

(52) U.S. Cl.
    CPC ............ *B65D 75/5894* (2013.01); *B32B 1/00* (2013.01); *B32B 3/00* (2013.01); *B32B 3/06* (2013.01);
                    (Continued)

(58) Field of Classification Search
    CPC .... B65D 75/5894; B65D 75/04; B65D 65/40; B65D 65/14; B65D 79/02; B32B 1/00; B32B 3/00; B32B 3/06; B32B 3/08; B32B 7/00; B32B 7/04; B32B 7/06; B32B 7/10; B32B 7/12; B32B 27/00; B32B 27/06; B32B 27/08; B32B 27/18; B32B 27/28
                    (Continued)

(56) References Cited

U.S. PATENT DOCUMENTS 5,020,831 A      6/1991   Benardelli
5,683,774 A *   11/1997   Faykish ............... G03H 1/0011
                                                  283/101
                   (Continued)

FOREIGN PATENT DOCUMENTS

CA          2196606       2/1996
CA          2461583       2/1996
             (Continued)

OTHER PUBLICATIONS

International Search Report and Written Opinion for PCT/US/2015/063414 mailed Apr. 21, 2016.

*Primary Examiner* — Chun Cheung
(74) *Attorney, Agent, or Firm* — Andrus Intellectual Property Law, LLP

(57) ABSTRACT

A tamper evident label flap positioned to cover an opening in a package. The label flap includes a base layer having a top surface and a bottom surface. A top layer is attached to the base layer by an adhesive layer. A tamper evident structure is located in at least one designated area between the base layer and the top layer. The tamper evident structure includes a first ink layer applied to the base layer and a second ink layer applied to the first ink layer. The first ink layer and the second ink layer are held together in a weaker bond than a bond between the top layer and the base layer. When the label flap is initially pulled from the package, the first ink layer and the second ink layer separate and define a visible permanent de-lamination which signifies the package has been opened.

17 Claims, 6 Drawing Sheets

(51) Int. Cl.
- B65D 79/02 (2006.01)
- B65D 75/04 (2006.01)
- B65D 65/40 (2006.01)
- G09F 3/00 (2006.01)
- B32B 7/00 (2006.01)
- B32B 7/04 (2006.01)
- B32B 7/06 (2006.01)
- B32B 7/10 (2006.01)
- B32B 7/12 (2006.01)
- B32B 27/00 (2006.01)
- B32B 27/06 (2006.01)
- B32B 27/08 (2006.01)
- B32B 27/18 (2006.01)
- B32B 27/28 (2006.01)
- B32B 1/00 (2006.01)
- B32B 3/00 (2006.01)
- B32B 3/06 (2006.01)
- B32B 3/08 (2006.01)
- G09F 3/02 (2006.01)

(52) U.S. Cl.
CPC .................. *B32B 3/08* (2013.01); *B32B 7/00* (2013.01); *B32B 7/04* (2013.01); *B32B 7/06* (2013.01); *B32B 7/10* (2013.01); *B32B 7/12* (2013.01); *B32B 27/00* (2013.01); *B32B 27/06* (2013.01); *B32B 27/08* (2013.01); *B32B 27/18* (2013.01); *B32B 27/28* (2013.01); *B65D 65/14* (2013.01); *B65D 65/40* (2013.01); *B65D 75/04* (2013.01); *B65D 79/02* (2013.01); *G09F 3/0292* (2013.01); *B32B 2250/00* (2013.01); *B32B 2307/40* (2013.01); *B32B 2307/402* (2013.01); *B32B 2307/4023* (2013.01); *B32B 2307/4026* (2013.01); *B32B 2307/412* (2013.01); *B32B 2307/7242* (2013.01); *B32B 2307/7244* (2013.01); *B32B 2307/7246* (2013.01); *B32B 2307/7248* (2013.01); *B32B 2307/75* (2013.01); *B32B 2405/00* (2013.01); *B32B 2439/00* (2013.01); *B32B 2439/70* (2013.01); *B32B 2439/80* (2013.01); *B32B 2519/00* (2013.01); *B65D 2575/586* (2013.01); *G09F 2003/021* (2013.01); *G09F 2003/0255* (2013.01); *G09F 2003/0257* (2013.01); *G09F 2003/0272* (2013.01); *G09F 2003/0276* (2013.01)

(58) Field of Classification Search
USPC .................................................. 206/494, 807
See application file for complete search history.

(56) References Cited

U.S. PATENT DOCUMENTS

| | | | |
|---|---|---|---|
| 5,798,169 A | | 8/1998 | Smith |
| 6,033,762 A * | | 3/2000 | Decker .............. B65D 33/1616 220/214 |
| 6,113,271 A * | | 9/2000 | Scott .................. B65D 75/5838 206/494 |
| 6,428,867 B1 | | 8/2002 | Scott et al. |
| 6,436,483 B2 * | | 8/2002 | Palmasi ...................... 264/1.34 |
| 6,589,622 B1 | | 7/2003 | Scott |
| 6,918,532 B2 | | 7/2005 | Sierra-Gomez et al. |
| 7,344,744 B2 | | 3/2008 | Sierra-Gomez et al. |
| 7,371,008 B2 | | 5/2008 | Bonenfant |
| 7,744,517 B2 | | 6/2010 | Bonenfant |
| 7,842,365 B2 | | 11/2010 | Riggs |
| 8,308,363 B2 | | 11/2012 | Vogt et al. |
| 8,408,792 B2 | | 4/2013 | Cole et al. |
| 2006/0066096 A1* | | 3/2006 | Kan ....................... B65D 33/34 283/101 |

FOREIGN PATENT DOCUMENTS

| | | |
|---|---|---|
| JP | 2008052013 | 3/2008 |
| WO | 9604177 | 2/1996 |

* cited by examiner

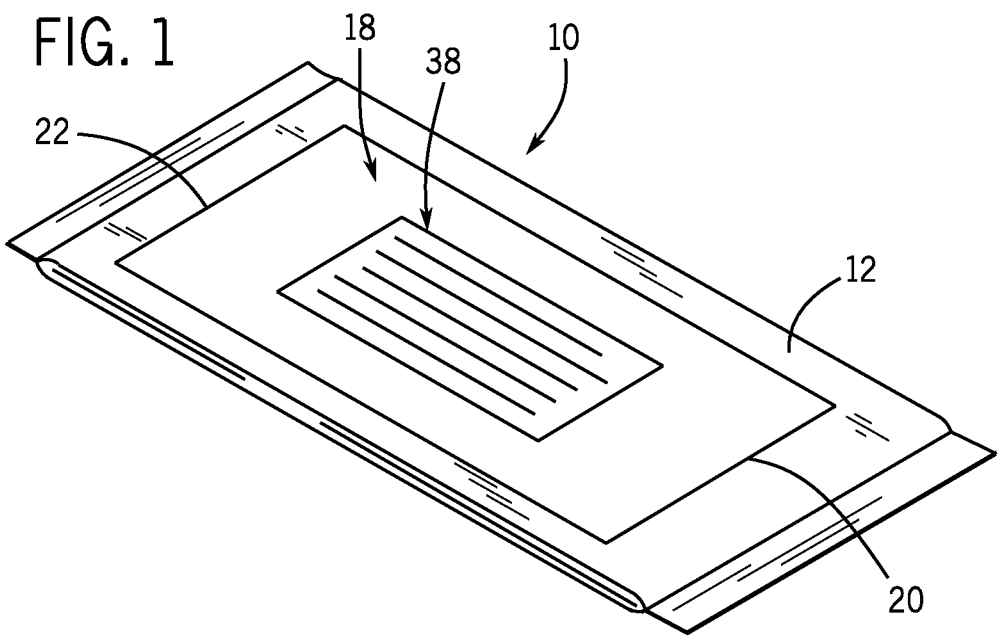
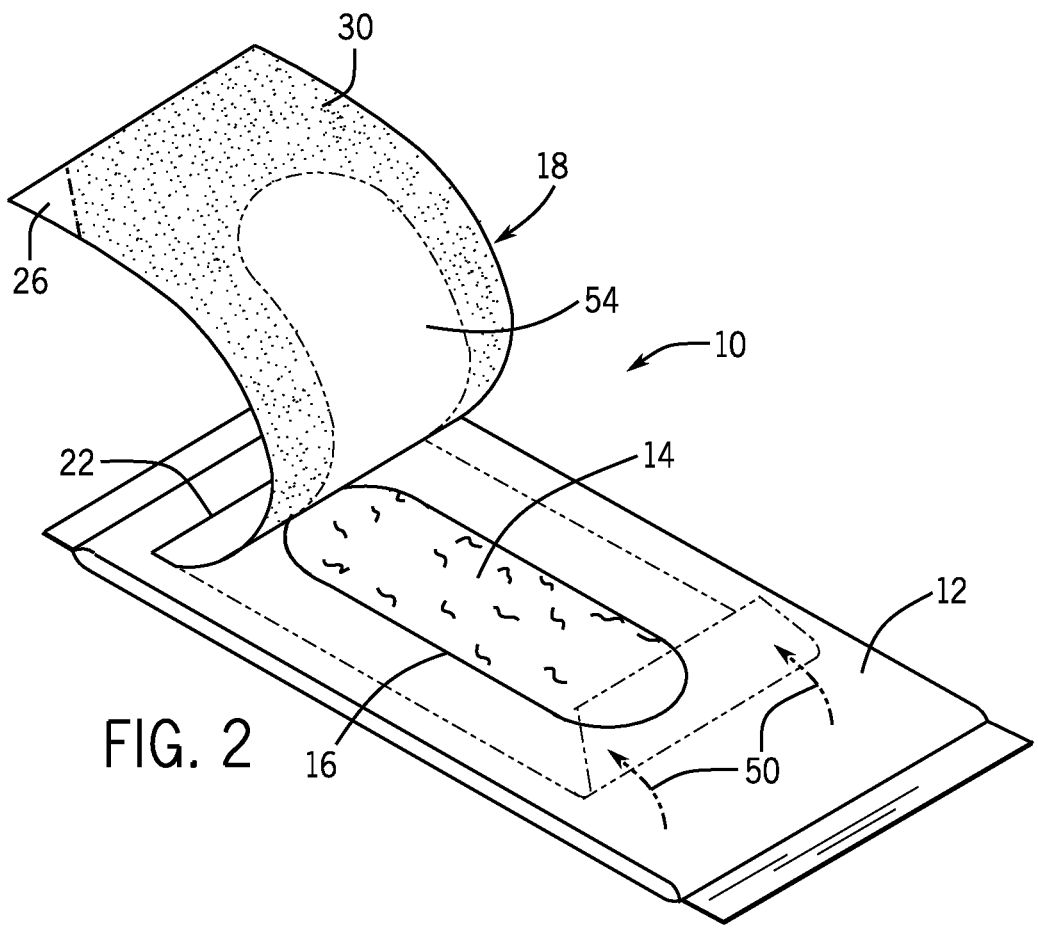

RESEALABLE LABEL FLAP WITH TAMPER EVIDENT STRUCTURE

BACKGROUND OF THE INVENTION

The present disclosure relates to a resealable label flap positionable to cover an opening in a product package containing removable articles such that the label flap can be repeatedly removed and reapplied to access the articles contained within the package. More specifically, the present disclosure relates to a resealable label flap that includes a tamper evident structure that separates and remains within the label flap after the label flap is removed from the product package for the first time.

Resealable label flaps are commonly used with product packages that include packaged removable articles. The product package is generally constructed from a thin, liquid impervious material that has an opening over which the label flap is removably adhered. Typically, the label flap is a strip of flexible or semi-rigid thermoplastic material having a removable pressure-sensitive adhesive applied to one surface of the label. The removable adhesive creates a generally air-tight seal around the package opening to prevent the packaged removable articles from drying out or becoming contaminated during storage.

Since resealable label flaps can be continuously removed and reapplied to the product package containing removable articles without any indication that the product package has been previously opened, it is known to configure a resealable label flap that provides an indication that the product package has been opened and subsequently resealed. It remains desirable to provide a resealable label flap with a tamper evident structure with layers that delaminate upon opening and cannot be relaminated so that the tamper evidence is permanent and unmistakable.

SUMMARY OF THE INVENTION

The present disclosure relates to a tamper evident label flap positionable to cover an opening in a package containing removable articles. The label flap includes a base layer sized and shaped to cover the opening in the package. The base layer has a top surface and a bottom surface including a first adhesive to permit removal and application of the label flap to the package. A top layer is attached to the top surface of the base layer by an adhesive layer such that the top layer is laminated with the base layer. A tamper evident structure is located in at least one designated area between the base layer and the top layer. The tamper evident structure includes a first ink layer applied to the surface of the base layer, and a second ink layer applied to the top surface of the first ink layer and aligned with the first ink layer. When the label flap is initially pulled from the package, the first ink layer and the second ink layer separate at the at least one designated area and remain within the laminated base layer and the top layer defining a visible permanent de-lamination of the first ink layer and the second ink layer which signifies that the package has been opened.

In an exemplary embodiment, the first ink layer and the second ink layer are different colors. The tamper evident structure is located in at least one designated area between an outer periphery of the label flap and an outer periphery of the opening. The first ink layer remains attached to the base layer, and the second ink layer remains attached to the top layer. A bond inhibitor is interposed between the first ink layer and the second ink layer. The de-lamination of the first ink layer and the second ink layer is visible through the top layer.

The present disclosure further relates to a tamper evident label flap positionable to cover an opening in a package containing removable articles. The label flap includes a base layer sized and shaped to cover the opening in the package. The base layer has a top surface and a bottom surface including a peelable adhesive to permit removal and application of the label flap to the package. A top layer is attached to the top surface of the base layer by an adhesive layer such that the top layer is laminated with the base layer. A tamper evident structure is located in at least one designated area between the base layer and the adhesive layer. The tamper evident structure includes a first ink layer of one color applied to the surface of the base layer, and a second ink layer of a second color different than the first color applied to the first ink layer. Upon reaching a radius of curvature when the label flap is initially pulled from the package, the first ink layer and the second ink layer delaminate at a void in the at least one designated area and remain within the laminated base layer and the top layer to provide an indication of the opening of the package.

In an exemplary embodiment, the one color is a light color and the second color is a darker color than the first color. The first ink layer is superposed and aligned with the second ink layer. A central area of the label flap is provided with printed information visible from the top layer.

The present disclosure additionally relates to a resealable package including a flexible package body having an internal space sized to contain a plurality of removable articles. An elongated opening is formed through the package body for accessing the removable articles. A resealable flexible label flap is positioned on the flexible package to cover the opening in the package. The label flap includes a base layer sized and shaped to cover the opening in the package. The base layer has a top surface and a bottom surface including a first adhesive to permit removal and application of the label flap to the package. A top layer is attached to the top surface of the base layer by an adhesive layer such that the top layer is laminated with the base layer. A tamper evident structure is located in at least one designated area between the base layer and the top layer. The tamper evident structure includes a first ink layer applied to the base layer and a second ink layer applied to the top surface of the first ink layer and aligned with the first ink layer. The first ink layer and the second ink layer are held together in a weaker bond than a bond between the first adhesive and the package. When the label flap is initially pulled from the package, the first ink layer and the second ink layer separate at the at least one designated area and remain within the laminated base layer and the top layer defining a visible permanent de-lamination of the first ink layer and the second ink layer which signifies that the package has been opened.

The label flap includes a starting tab spaced from the opening and formed devoid of the first adhesive.

BRIEF DESCRIPTION OF THE DRAWINGS

The drawings illustrate the best mode presently contemplated of carrying out the invention. In the drawings:

FIG. 1 is a perspective view of a product package containing removal articles including a resealable label flap with tamper evident structure in accordance with the present disclosure;

FIG. 2 is a perspective view illustrating the product package with the resealable label flap in an open position thereby permitting removal of the contained articles;

DETAILED DESCRIPTION OF THE INVENTION

Figure 3:
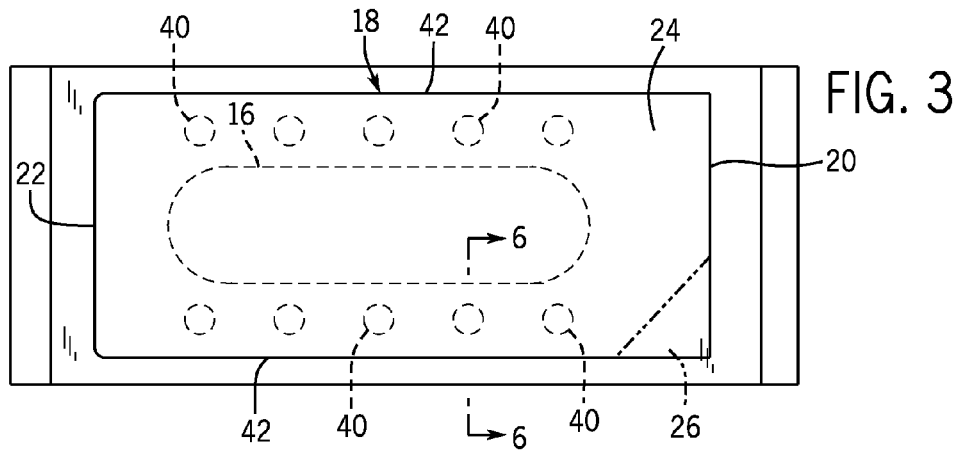
FIG. 3 is a top view of the product package including one embodiment of the resealable label flap with the tamper evident structure.

FIGS. 1 and 2 illustrate a resealable product package 10 having a main package body 12 which may be embodied in various forms. In the example shown, the package body 12 is formed from a liquid-impervious flexible thermoplastic material heat sealed on each end or to another material to define an internal space for housing removable articles 14 contained within the package 10. However, it should be understood that the package body 12 may be otherwise suitably configured, such as, for example, a thermoformed tray. In the embodiment illustrated, the removable articles 14 are shown as a series of stacked wet wipes or hand towels, but the removable articles 14 are not limited to this particular form.

The package body 12 is provided with a die cut opening 16 to provide access to the internal space of the package body 12 containing the removable articles 14. As can be readily understood, the articles 14 can be removed from the internal space through the opening 16.

The product package 12 includes a partially removable, flexible label flap 18 that is applied to the package body 12 to seal the package body 12 by covering the opening 16. The label flap 16 contacts a generally smooth, flat top surface of the package body 12, and forms a generally water and air tight seal with the package body 12 around the opening 16. This seal around the opening 16 prevents dehydration, contamination or other adulteration of the articles 14 stored in the package body 12.

The label flap 18 is resealably attached to the upper surface of the package body 12 such that the label flap 18 can be repeatedly opened and resealed to provide access to the articles 14 contained within the internal space defined by the package body 12. The label flap 18 extends between a first end 20 which is releasable from the package body 12, and a second end 22 which remains affixed to the package body 12 to prevent complete removal of the label flap 18 from the package body 12.

Figure 4:
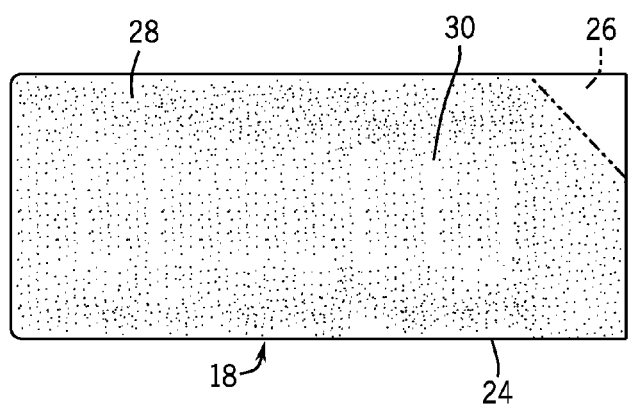
FIG. 4 is a bottom view of the resealable label flap.

As can be seen in FIGS. 3 and 4, the label flap 18 has a main body portion 24 and an integrally formed starting tab 26. In general, the main body portion 24 includes a removable adhesive that allows the label flap 18 to be repeatedly peeled from the package body 12, and then reapplied thereto in order to gain access to the opening 16 and then reseal the product package 10. The resealable adhesive contained on the main body portion 24 generally retains its adhesive properties during repeated application and removal of the main body portion 24 relative to the package body 12.

The starting tab 26 is a portion of the label flap 18 in which the adhesive on the label flap 18 is rendered ineffective or in the alternative, not present such that the starting tab 26 can be grasped by the user to pull the label flap 18 from the package body 12. In the drawings, the starting tab 26 is configured with a triangular shape at a corner of the label flap 18 adjacent the first end 20. However, it should be understood that the starting tab 26 may be alternatively shaped and located adjacent the label flap first end 20.

Referring now to FIG. 4, a bottom surface 28 of the main body portion 24 is covered by a first adhesive 30. In the preferred embodiment, the first adhesive 30 is a pressure-sensitive adhesive that retains its adhesive properties as the label flap 18 is repeatedly peeled from the package body 12 and reapplied thereto. The first adhesive 20 has the desired properties to form a seal around the opening 16 while also being able to be pulled from the package body 12 without damaging the thermoplastic material forming the package body 12.

In the examples shown, the starting tab 26 may include a masking layer applied over the first adhesive 30 to render the adhesive 30 ineffective such that the starting tab 26 does not adhere to the package body 12 when the label flap 18 is applied thereto. It is normally contemplated that the starting tab 26 is a "dead" tab devoid of the first adhesive 30. In any case, the back surface of the starting tab 26 does not adhere to the package body 12 when the label flap 18 is applied to the product package 10.

Figure 6:
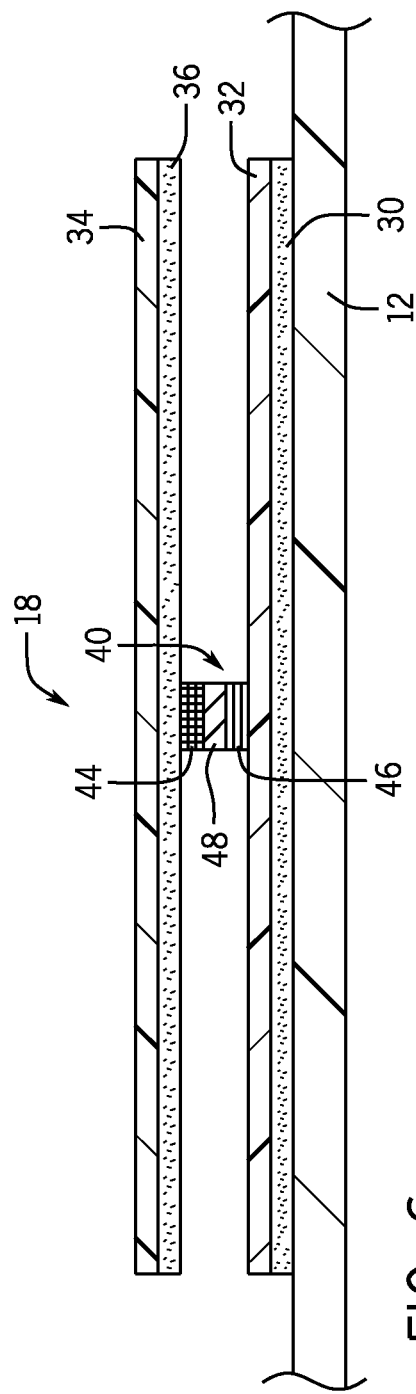
FIG. 6 is an enlarged sectional view of the resealable label flap with tamper evident structure as taken on line 6-6 of FIG. 3.
Figure 7:
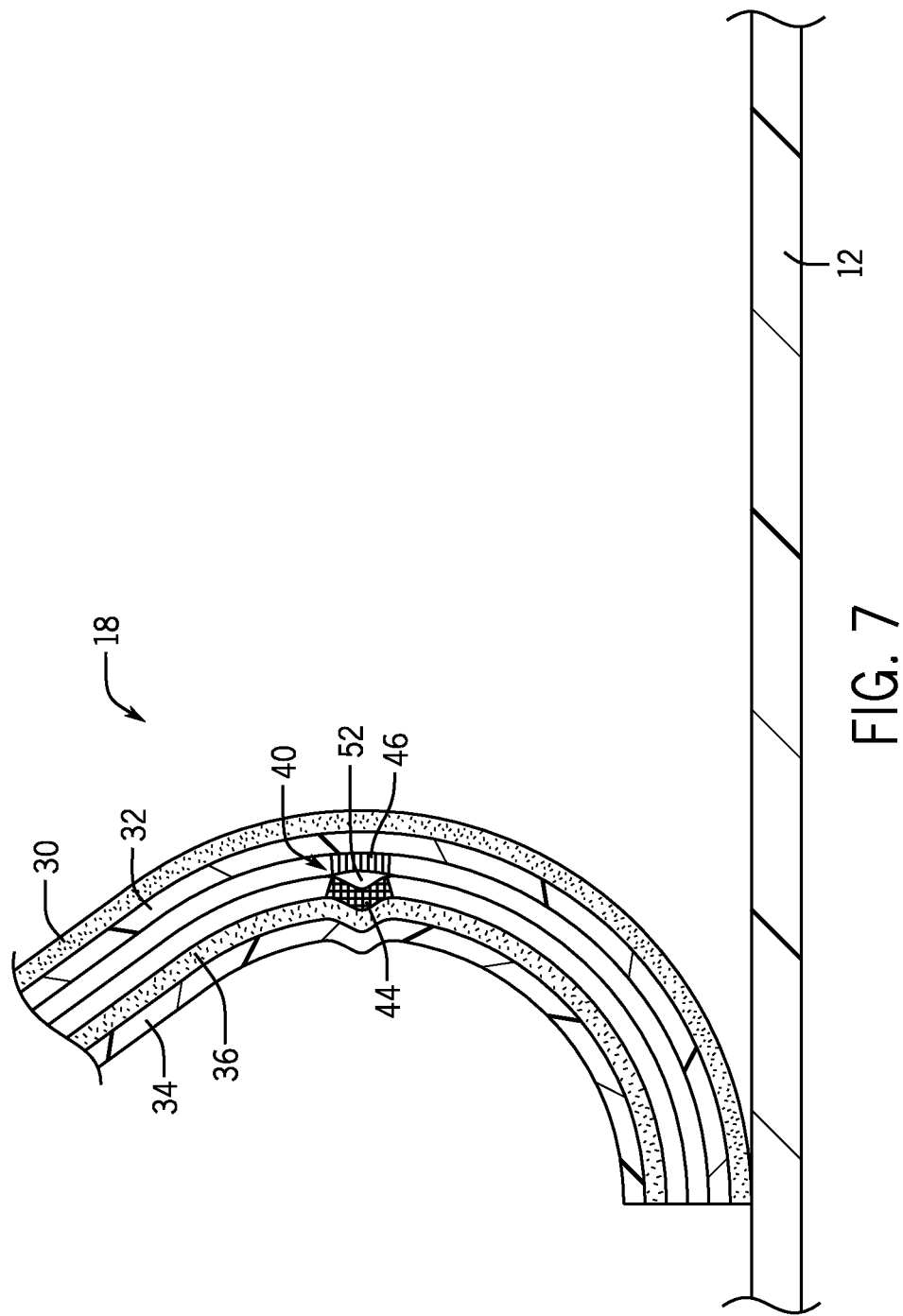
FIG. 7 is a view of the resealable label flap with tamper evident structure of FIG. 6 illustrating opening of the resealable label flap and actuation of the tamper evident structure.

The label flap 18 is generally a laminated construction comprised of multiple individual layers of material adhesively joined or bonded together to define an overall thickness of the label flap 18. Specifically, as illustrated in FIGS. 6 and 7, label flap 18 includes a label substrate or base layer 32 and an overlaminate or top layer 34 adhesively attached to a top surface of the base layer 32. Both the base layer 32 and the top layer 34 extend between the first end 20 and the second end 22 to define the overall length of the label flap 18 as illustrated in FIG. 1. The first adhesive 30 is applied to a bottom surface of the base layer 32 to releasably attach the base layer 32 and thus the label flap 18 to a top surface of the package body 12.

A lower surface of the top layer 34 includes an adhesive layer 36 such that the top layer 34 adheres to the top surface of the base layer 32. In the example shown, the top layer 34 and the adhesive layer 36 are transparent or clear such that printing and/or graphics 38 (FIG. 1) contained, for example, on a central portion of the base layer 32 are visible through the top layer 34.

Before the top layer 34 is applied over the base layer 32, tamper evident structure 40 is incorporated into the label flap 18, and defines a salient feature for allowing the user to determine whether the label flap 18 has been previously removed from the product package 10. In one exemplary embodiment shown in FIG. 3, the tamper evident structure 40 can be positioned at a plurality of spaced apart locations or designated areas extending longitudinally within the label flap 18. More particularly, the designated areas of the tamper evident structure 40 are aligned with each other and provided in two sets, each aligned set extending between a respective side edge 42 of the label flap 18 and a periphery of the opening 16. In the example of FIG. 3, the tamper evident structure 40 at each designated area has a similarly sized, circular shape, but other sizes and shapes of the tamper evident structure 40 are envisioned by the present disclosure.

As best seen in FIGS. 6 and 7, each tamper evident structure 40 is comprised of a first ink layer 46, a second ink layer 44 and a bond inhibitor 48 interposed between the first and second ink layers 44, 46, respectively. The first ink layer 46 is applied to the surface of the base layer 32 in one designated area of the tamper evident structure 40. The bond inhibitor is applied to the surface of the first ink layer 46 aligned with the first ink layer 46. The second ink layer 44 is applied to the top surface of the bond inhibitor layer 48 in the one designated area of the tamper evident structure 40 beneath and aligned with of the first ink layer 46. The first ink layer 46 and the second ink layer 44 form chemical bonds with the lower surface of the adhesive layer 36 and the upper surface of the base layer 32 so that they remain securely attached to the adhesive layer 36 and the base layer 32, respectively.

The first ink layer 46 and the second ink layer 44 are held together by a relatively weak adhesive provided by the bond inhibitor 48. In one exemplary embodiment of the disclosure, the first ink layer 46 is chosen as a first or light color, such as yellow, while the second ink layer 44 is a second or dark color, such as blue, different from the first color of the first layer such that a circular, aligned or superposed yellow over blue tamper evident structure 40 is normally visible in each designated area from the top of the label flap 18 before it is peeled back to access the opening 16 in the package body 12. The first and second ink layers 44, 46, respectively, may also have different patterns or characteristics.

In accordance with the disclosure, the bond inhibitor 48 used between the first ink layer 46 and the second ink layer 44 is chosen to provide a relatively weak adhesive bond which will enable delamination or separation of the first ink layer 46 from the second ink layer 44 in each designated area within the label flap 18 in a controlled manner as the label flap 18 is peeled back over the package body 12. Such delamination is designed to provide a visible sign through the top layer 34 that the label flap 18 has been opened. One way this can be accomplished is to design the bond between the first ink layer 46 and the second ink layer 44 with a relatively lower bond strength (e.g. 0.1 lbs./inch width) in each designated area, and a significantly higher bond strength (e.g. 1.0 lbs./inch width) in the remainder of the label flap 18.

Referring to FIGS. 1 and 2, after the package body 12 has been formed and filled with removable articles 14, the label flap 18 with tamper evident structure 40 incorporated therein is applied to the top surface of the package body 12 as illustrated. If a user desires to access the removable articles 14 within the package body 12, the user first grasps the starting tab 26 and pulls back in the direction of arrows 50. The user continues to pull back on the label flap 18 to overcome the adhesive bond between the first adhesive 30 and the package body 12. As seen in FIG. 7, when the bend in the pulled label flap exceeds a certain radius of curvature, the weakly bonded ink layers 44, 46 of the tamper evident structure 40 separate at a void 52 to provide an indication of the initial opening of the label flap 18. It is contemplated that the adhesive bond between the first and second ink layers, as controlled by the bond inhibitor, will be such that the ink layers will separate when the radius of curvature exceeds the minimum as determined by peel angle and material ply thickness and properties. The first time the label flap 18 is pulled from the package body, a die cut oval covering 54 (FIG. 2) separates from the package body 12 to define the opening 16. The oval covering 54 remains adhesively attached to the label flap 18 by means of the adhesive 30, and thereafter prevents contact between the adhesive 30 and the removable articles 14.

After the desired amount of articles 14 have been removed from the opening 16, the user repositions the label flap over the opening 16. The first adhesive 30 reseals the label flap 18 onto the package body 12 to form a desired fluid tight seal around the opening 16. However, once the ink layers 44, 46 in the designated area(s) have been delaminated at each void 52 during pulling back of the label flap 18, they cannot be relaminated. Instead, the delamination results in a highly visible change in appearance of the ink layers 44, 46 which is permanent and unmistakable as viewed through the top layer 34, and signifies that the product package 10 has been opened or tampered with.

Figure 5:
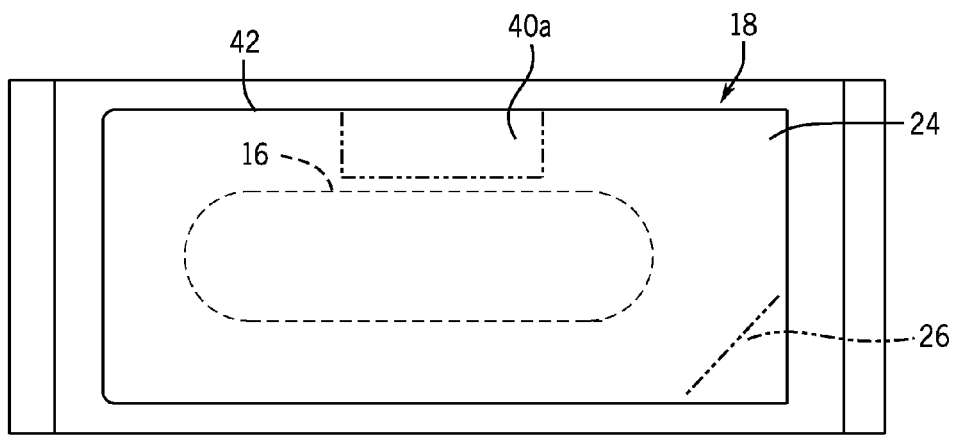
FIG. 5 is a top view of the product package including another embodiment of the resealable label flap with tamper evident structure.

An alternative tamper evident structure 40a shown in FIG. 5, and has the same ink layers 44, 46 and bond inhibitor 48 as previously described, but here is located in one designated area between one side edge 42 of the label flap 18 and the periphery of opening 16. In the example shown, the tamper evident structure 40a takes the form of a coupon or the like having a rectangular contour.

Figure 8:
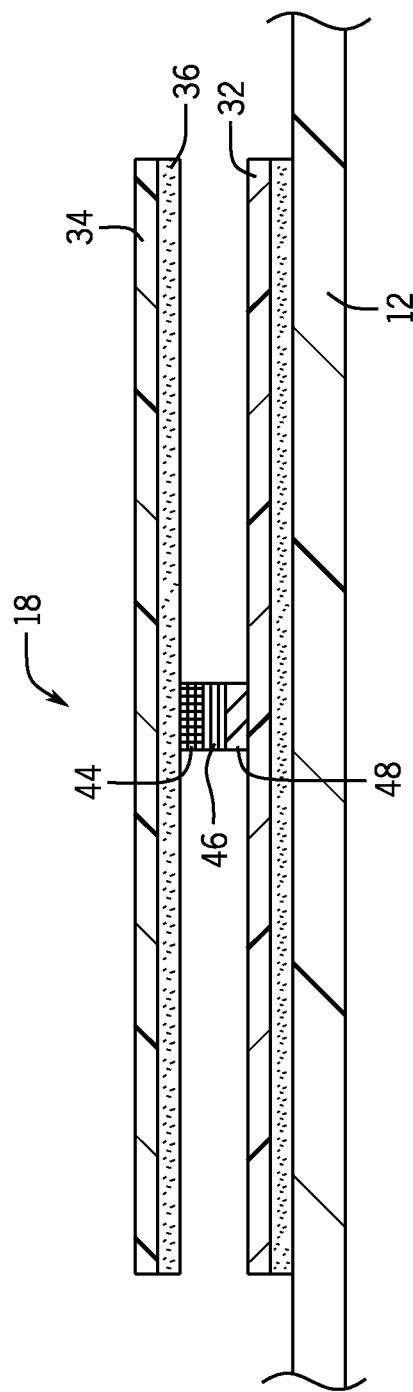
FIG. 8 is an enlarged sectional view of a second embodiment of the resealable label flap with the tamper evident structure.

The present disclosure contemplates that the bond inhibitor 48 may alternatively be positioned above or below the ink layers 44, 46. FIG. 8 illustrates a first alternate embodiment. In the alternate embodiment shown in FIG. 8, the bond inhibitor 48 is applied to the top surface of the base layer 32 and the first ink layer 46 is positioned between the bond inhibitor 48 and the second ink layer 44. In this embodiment, the bond inhibitor 48 provides a relatively weak adhesive bond between the first ink layer 46 and the base layer 32. The first ink layer 46 separates from the base layer 32 as the label flap 18 is peeled back over the package body 12.

Figure 9:
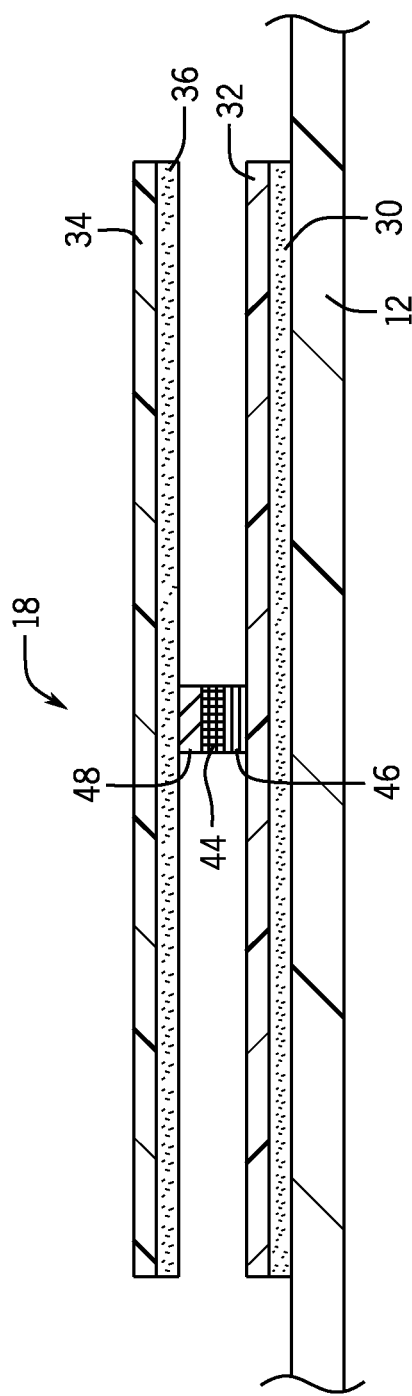
FIG. 9 is an enlarged sectional view of a third embodiment of the resealable label flap with the tamper evident structure.

FIG. 9 illustrates a third embodiment in which the bond inhibitor 48 is located between the second ink layer 44 and the top layer 36. The first ink layer 46 and the second ink layer 44 are printed on top of each other and the bond inhibitor 48 is located between the second ink layer 44 and the adhesive layer 36 contained on the lower surface of the top layer 34. During removal of the label flap 18, the second ink layer 44 separates from the top layer 34 to provide a visible sign that the label flap has been opened.

The present disclosure thus provides a resealable label flap with joined laminated layers that include a tamper evident structure having different color superposed ink layers incorporated within the laminated layers in at least one designated area. The tamper evident structure is formed within the outer boundaries of the label flap with a bond strength specifically selected such that upon reaching a certain bend radius during opening of the label flap, the ink layers of the label flap separate at the at least one designated area and remain de-laminated within the laminated layers. Such separation results in a clear visible indication of label flap opening which is evident to a user in the form of a change in appearance including color or other characteristics.

It should be appreciated that, in use, the label flap is designed such that inter-laminar bonds of the laminated structure remain capable of withstanding forces that occur when the label flap is peeled back, but is particularly configured to enable the tamper evident structure only to delaminate at one or more designated areas within the laminated label flap to provide a desired indication of the initial opening thereof.

Various alternatives and embodiments are contemplated as being within the scope of the following claims particularly pointing out and distinctly claiming the subject matter regarded as the invention.

What is claimed is:

1. A tamper evident label flap positionable to cover an opening in a package containing removable articles, the label flap comprising:
   a base layer sized and shaped to cover the opening in the package, the base layer having a top surface and a bottom surface, the bottom surface including a first adhesive to permit removal and application of the label flap to the package;
   a top layer attached to the top surface of the base layer by an adhesive layer such that the top layer is laminated with the base layer;
   a tamper evident structure located in at least one designated area between the base layer and the top layer;
   wherein the tamper evident structure includes a first ink layer applied to the top surface of the base layer and a second ink layer applied to the first ink layer and aligned with the first ink layer, the first ink layer and the second ink layer being held together in a weaker bond than the bond between the base layer and the top layer; and
   wherein, when the label flap is initially pulled from the package, the first ink layer and the second ink layer separate at the at least one designated area and both the first ink layer and the second ink layer remain between the laminated base layer and the top layer to define a visible permanent de-lamination of the first ink layer and the second ink layer which signifies the package has been opened.

2. The label flap of claim 1, wherein the first ink layer and the second ink layer are different colors.

3. The label flap of claim 1, wherein the tamper evident structure is located in the at least one designated area between an outer periphery of the label flap and an outer periphery of the opening.

4. The label flap of claim 1, wherein the second ink layer remains attached to the adhesive layer and the first ink layer remains attached to the base layer.

5. The label flap of claim 1, wherein a bond inhibitor is interposed between the first ink layer and the second ink layer.

6. The label flap of claim 1, wherein the de-lamination of the first ink layer and the second ink layer is visible through the top layer.

7. A tamper evident label flap positionable to cover an opening in a package containing removable articles, the label flap comprising:
   a base layer sized and shaped to cover the opening in the package, the base layer having a top surface and a bottom surface, the bottom surface including a peelable adhesive to permit removal and application of the label flap to the package;
   a top layer attached to the top surface of the base layer adhesive such that the top layer is laminated with the base layer;
   a tamper evident structure located in at least one designated area between the base layer and the adhesive layer;
   wherein the tamper evident structure includes a first ink layer, a second ink layer and a bond inhibitor, and wherein, upon reaching a radius of curvature when the label flap is initially pulled from the package, the top layer and the bottom layer delaminate but do not separate from each other only at the location of the tamper evident structure to provide an indication of the opening of the package.

8. The label flap of claim 7, wherein the first ink layer is a first color and the second ink layer is a second color different from the first color.

9. The label flap of claim 7, wherein the first ink layer is superposed and aligned with the second ink layer.

10. The label flap of claim 7, wherein the first ink layer is applied to the base layer and the second ink layer is applied to the top layer, wherein the first ink layer and the second ink layer are held together in a weaker bond than a bond between the base layer and the top layer.

11. The label flap of claim 10, wherein the bond inhibitor is located between the first ink layer and the second ink layer.

12. The label flap of claim 7, wherein the tamper evident structure is located in the at least one designated area between an outer periphery of the label flap and an outer periphery of opening.

13. The label flap of claim 7, wherein a central area of the label flap is provided with printed information visible through the top layer.

14. A resealable package comprising:
   a flexible package body having an internal space sized to contain a plurality of removable articles;
   an elongated opening formed through the package body for access to the removable articles;
   a resealable flexible label flap positioned on the flexible package to cover the opening in the package, the label flap including:
   a base layer sized and shaped to cover the opening in the package, the base layer having a top surface and a bottom surface, the bottom surface including a first adhesive to permit removal and application of the label flap to the package;
   a top layer attached to the top surface of the base layer by an adhesive layer such that the top layer is laminated with the base layer;
   a tamper evident structure located in at least one designated area between the base layer and the top layer;
   wherein the tamper evident structure includes a first ink layer applied to the top surface of the base layer and a second ink layer applied to the first ink layer and aligned with the first ink layer, the first ink layer and the second ink layer being held together by a bond inhibitor to create a weaker bond than a bond between the top layer and the base layer; and
   wherein when the label flap is initially pulled from the package, the first ink layer and the second ink layer separate at the at least one designated area and both the first ink layer and the second ink layer remain between the laminated base layer and the top layer to define a visible permanent de-lamination of the first ink layer and the second ink layer which signifies the package has been opened.

15. The resealable package of claim 14, wherein the label flap includes a starting tab spaced from the opening and formed devoid of the first adhesive.

16. The resealable package of claim 14, wherein the first ink layer and the second ink layer are different colors.

17. The resealable package of claim 14, wherein the tamper evident structure is located between an outer periphery of the label flap and an outer periphery of the opening.

* * * * *